US006281876B1

(12) United States Patent
Jones, Jr.

(10) Patent No.: US 6,281,876 B1
(45) Date of Patent: Aug. 28, 2001

(54) METHOD AND APPARATUS FOR TEXT IMAGE STRETCHING

(75) Inventor: Morris E. Jones, Jr., Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/261,640

(22) Filed: Mar. 3, 1999

(51) Int. Cl.[7] .............................. G09G 5/22; G09G 1/14; G09G 5/26; G06T 11/00

(52) U.S. Cl. ............................ 345/141; 345/26; 345/130; 345/471

(58) Field of Search ................................ 345/3, 141, 203

(56) References Cited

U.S. PATENT DOCUMENTS

| | | | | |
|---|---|---|---|---|
| Re. 36,670 | * | 4/2000 | Watts, Jr. et al. | 345/87 |
| 4,107,786 | | 8/1978 | Masaki et al. | 364/900 |
| 4,156,238 | * | 5/1979 | Glasson et al. | 345/26 |
| 4,345,245 | | 8/1982 | Vella et al. | 340/744 |
| 4,346,377 | | 8/1982 | Green | 340/731 |
| 4,393,377 | * | 7/1983 | Couper et al. | 345/127 |
| 4,476,464 | | 10/1984 | Hobbs | 340/731 |
| 4,555,191 | | 11/1985 | Gojo | 400/121 |
| 4,630,039 | * | 12/1986 | Shimada | 345/130 |
| 4,646,077 | * | 2/1987 | Culley | 345/551 |
| 4,716,405 | * | 12/1987 | Yamaguchi | 345/141 |
| 4,849,747 | * | 7/1989 | Ogawa et al. | 345/467 |
| 4,922,237 | * | 5/1990 | Inoue | 345/26 |
| 5,001,652 | * | 3/1991 | Thompson | 345/520 |
| 5,079,545 | | 1/1992 | Priem et al. | 340/747 |
| 5,248,964 | | 9/1993 | Edgard et al. | 345/114 |
| 5,309,552 | * | 5/1994 | Horton et al. | 345/431 |
| 5,399,947 | * | 3/1995 | Washburn | 405/119 |
| 5,414,524 | | 5/1995 | Payson et al. | 358/426 |
| 5,446,840 | * | 8/1995 | Kiuchi et al. | 345/509 |
| 5,521,614 | * | 5/1996 | Kotha et al. | 345/128 |
| 5,539,428 | * | 7/1996 | Bril et al. | 345/471 |
| 5,613,052 | | 3/1997 | Narayanaswami | 395/134 |
| 5,668,941 | | 9/1997 | Noorbakhsh | 345/434 |
| 5,699,277 | | 12/1997 | Munson et al. | 364/514 |
| 5,705,891 | * | 1/1998 | Ishida et al. | 345/1 |
| 5,724,067 | * | 3/1998 | Atchley et al. | 345/141 |
| 5,742,298 | * | 4/1998 | Bril et al. | 345/501 |
| 5,793,350 | * | 8/1998 | Chandavarkar et al. | 345/130 |
| 5,874,937 | | 2/1999 | Kesatoshi | 345/127 |
| 5,940,085 | * | 8/1999 | Chandavarker et al. | 345/471 |
| 6,034,673 | * | 3/2000 | Kim | 345/551 |
| 6,078,702 | * | 6/2000 | Matono et al. | 382/298 |

* cited by examiner

*Primary Examiner*—Jeffery Brier
*Assistant Examiner*—Ryan Yang
(74) *Attorney, Agent, or Firm*—John P. Schaub; Thelen Reid & Priest LLP

(57) ABSTRACT

A method and apparatus for horizontally expanding a video graphics adapter (VGA) text character display image to fully fill the screen of a flat panel display. Cell lines for each character are remapped to provide expanded cell lines. The flat panel apparatus includes a video memory for storing the character code, attribute data and font data, a character generator for generating character font data based on the character code, a lookup table for providing expanded cell lines, and an attribute controller for combining the font data and the attribute data for output to a flat panel display.

9 Claims, 6 Drawing Sheets

METHOD AND APPARATUS FOR TEXT IMAGE STRETCHING

BACKGROUND OF THE INVENTION

1. Field Of The Invention

The present invention relates to video display systems. More particularly, the present invention relates to a method and apparatus for expanding a text image to fit within a display that supports images of higher resolution, resulting in an image that optimally fits within a display.

2. Background

For the purposes of this disclosure, a panel-like display may be any class of display means having a fixed pixel resolution, i.e., a display that has a fixed number of pixel lines upon which scan lines may be rasterized. For example, for maximum display resolution, a panel-like display provides one pixel line for every scan line that comprises an image. One such display may be a flat panel display such as that found in portable computers and laptops, as commonly known in the art.

Currently, most displays use Cathode Ray Tube (CRT) technology because it is well known and cost effective. However, panel-like displays have been gaining in popularity, due in part to their superior size, weight and power consumption characteristics. This popularity of panel-like displays has resulted in the use of panel-like, display technology instead of CRT technology for computer products.

This use of panel-like technology for applications has put a premium on software compatibility. When new computer equipment is developed, it is important to provide software compatibility with the new computer equipment. If software written for the old computer equipment does not run on the new computer equipment, new software must be developed. In order to avoid creating new software, new computers are generally designed so that previously written software can be used.

On-screen resolution is important for displays, since it determines how sharp text characters and graphics will appear. Currently, three resolution standards predominate: CGA (640×200); double-scanned CGA (640×400); and VGA (640×480). VGA is most popular in current panel-like displays because it is the same standard used by most current desktop displays. Using VGA for panel-like displays therefore allows using the same software and drivers as desktop displays.

A problem exists when VGA images are displayed on panel-like displays. The resolution of flat panel displays is commonly 800×600, 1024×768, or 1280×1024 pixels. Unlike CRTs, panel-like displays have a fixed number of pixels and lines that are lighted when the monitor is in use. Therefore, when the screen size is larger than the VGA standard resolution of 640×480 pixels, the display on the screen does not utilize the full screen area.

Improvements are made possible by filling the entire screen regardless of what mode the video system operates in. These improvements adjust the image size, depending on whether the panel operates in text or graphics mode.

One improvement expands a VGA display to fill a panel-like display by duplicating pixels according to a scheme formulated based upon the current resolution and the desired resolution. In text mode, this can make adjacent lines and columns of text appear to be different sizes. FIG. 1 illustrates scaling of text images via pixel duplication. Reference numeral 10 shows text characters before scaling. Reference numeral 12 shows the same text characters after upscaling by a factor of four. The scaled text 12 appears noticeably blocky. Edges not apparent in the original text 10 are noticeable in the scaled text 12.

Another improvement expands a VGA display by interpolating the pixel data in each scan line of the digital input image. Linear interpolation is used for column data, and bilinear interpolation is used for row data. This method requires complicated circuitry and results in text images having reduced sharpness.

With the advent of operating systems with integrated VGA and better resolution, systems employing text mode are often not supported. This may hinder or prevent running old applications on new systems. A need exists in the prior art for a video display system compatible with existing software that can expand a VGA image in text mode to fit a panel-like display while maintaining image quality.

BRIEF DESCRIPTION OF THE INVENTION

The present invention provides for expanding the text of a standard VGA graphics format within a larger display. In the current invention, text expansion in the horizontal direction is performed to fill a panel-like display. Text expansion is accomplished by remapping individual cell lines to create new scan lines, which fill a panel-like display.

For this disclosure, a panel-like display is a display that has a fixed number of pixel lines such as a flat panel LCD display and will hereinafter be referred to as a "display".

DETAILED DESCRIPTION OF THE PREFERRED EMBODIMENTS

Those of ordinary skill in the art will realize that the following description of the present invention is illustrative only and not in any way limiting. Other embodiments of the invention will readily suggest themselves to such skilled persons having the benefit of this disclosure.

Figure 1:
FIG. 1 illustrates text character expansion by pixel duplication.
Figure 2:
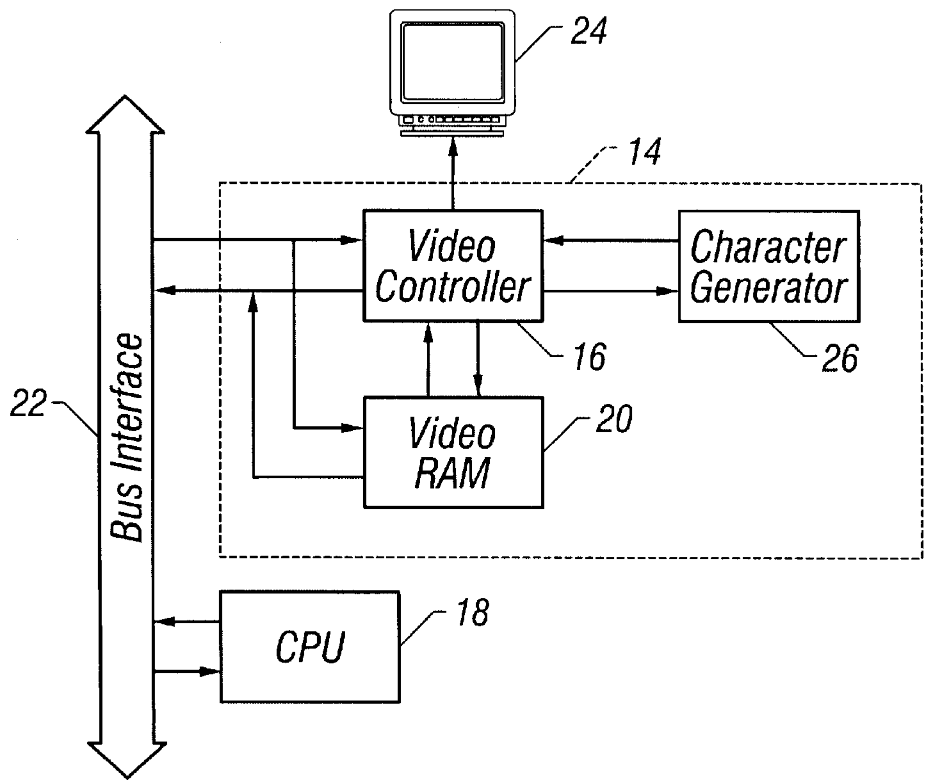
FIG. 2 is a simplified block diagram of a typical VGA for the generation of text images on a video display.

FIG. 2 is a block diagram illustrating the general structure of a graphics adapter 14. The main part of a graphics adapter 14 is the video controller or graphics control chip CRTC (cathode ray tube controller) 16. The CRTC 16 supervises the functions of the adapter 14 and generates the necessary control signal. The CPU 18 accesses the video RAM 20 via the bus interface 22 to write information that defines the text or graphics the monitor 24 is to display. The CRTC 16 continuously generates addresses for the video RAM 20 to read the corresponding characters, and to transfer them to the character generator 26.

Figure 3:
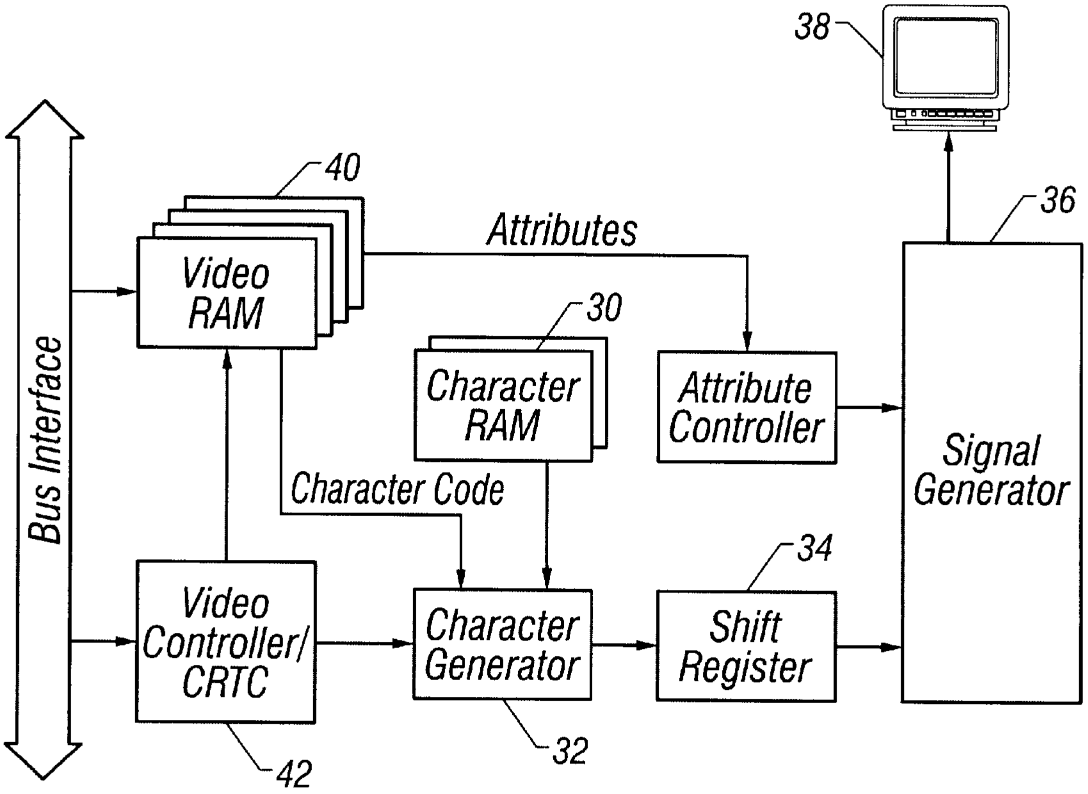
FIG. 3 is a more detailed schematic diagram of a VGA from the io block diagram of the VGA depicted in FIG. 2.

Referring now to FIG. 3, a diagram of a typical VGA 16 is illustrated. In text mode, the characters are usually defined by their ASCII codes, which are further assigned an attribute. The attribute defines the display mode for a particular character more precisely. Some typical attributes include whether it is to be displayed in a blinking, bold, or inverted manner. The character generator RAM, for every ASCII code, holds a pixel pattern for the corresponding character. The character generator 32 converts the character codes using the pixel pattern in the character RAM 30 into a sequence of pixel bits, and transfers them to a shift register 34. The signal generator 36 generates the necessary signals for the monitor 38, using the bit stream from the shift register 34, the attribute information from the video RAM 40, and the synchronization signals from the CRTC 42. The monitor 38 processes the passed video signals and displays the symbolic information in the video RAM 40 in the usual form as a picture.

In text mode, every text row is generated by a number of scanlines. Graphics adapters typically use 14 scanlines for one text row; every character is represented in text mode by a pixel block comprising a height of 14 scanlines and a width of nine pixels. As every character is separated by a narrow space from the next character, and every row by a few scanlines from the next row, the complete block is not occupied by character pixels. For the actual character a 7×11 matrix is available, the reset of the 9×14 matrix remains empty. Also in text mode, every alphanumeric character is displayed as a pixel pattern held in the character RAM 30. A "1" means that at the location concerned, a pixel with the foreground color is written, and a "0" means that a pixel with the background color appears.

The description of character cells consisting of 14 scanlines of nine pixels each is not intended to be limiting in any way. Those of ordinary skill in the art will recognize that other sizes may be used as well.

In accordance with one embodiment of the present invention, the cell lines supplied by the character generator are remapped to expanded cell lines. The cell lines are selected based upon the row number and the dot pattern supplied by the character generator. The remapping may be implemented using a lookup table. However, those of ordinary skill in the art will recognize that other implementations are possible.

Figure 4:
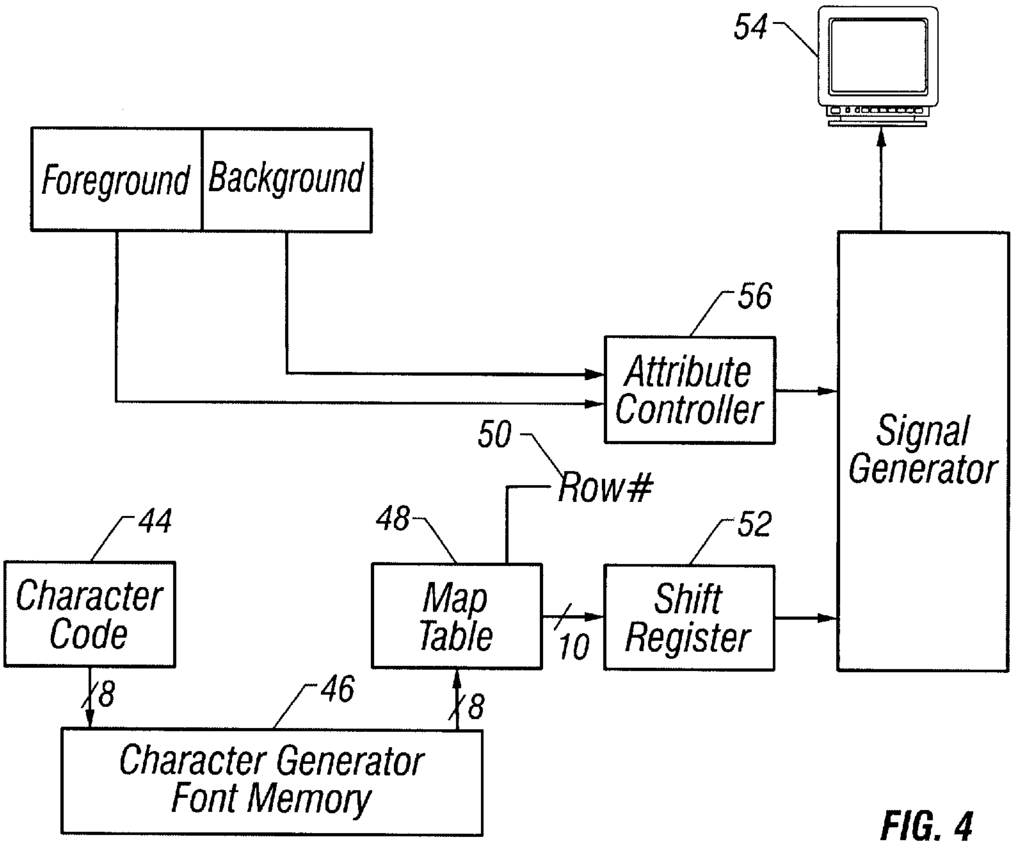
FIG. 4 is a block diagram of a VGA for the generation of text images on a flat panel display according to one embodiment of the present invention.

Referring to FIG. 4, a block diagram of the above mentioned embodiment is presented. An eight-bit character code 44 is presented to the character generator font memory 46. The character generator returns an eight-bit dot pattern corresponding to the character code 44. The dot pattern is presented to a map table 48, which returns a ten-bit expanded dot pattern based upon the row number and the character code. The expanded dot pattern is presented to a shift register 52 for orderly output to the display 54 according to the attribute data supplied by the video RAM 40. Those of ordinary skill in the art will recognize expanded bit patterns of sizes greater than ten may be used to create expanded row information for displays having more than 800 pixels per scan line.

Figure 5:
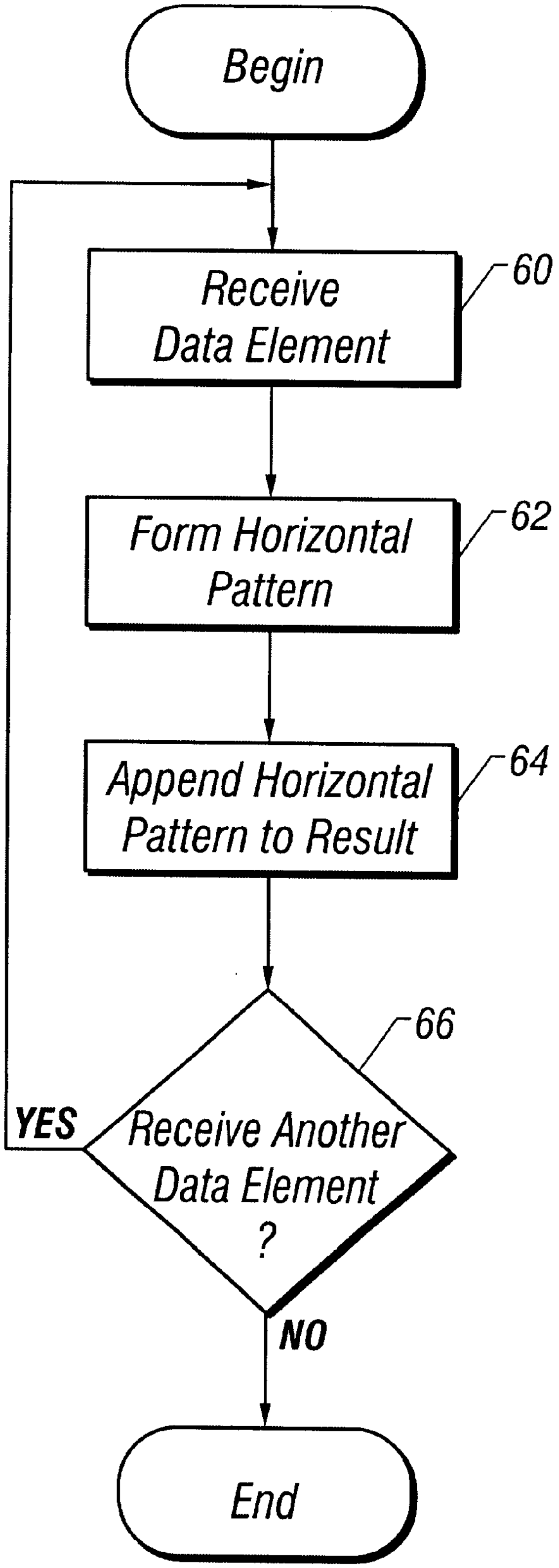
FIG. 5 is a flow diagram illustrating a method for stretching a text image in accordance with one embodiment of the present invention.

Referring now to FIG. 5, a method for the above embodiment is presented. At reference numeral 60, a data element is received from the character generator 32. The data element comprises a sequence of bits representing a cell line.

At reference numeral 62, a horizontal expansion pattern is formed. The remapping may be implemented using a lookup table indexed by the data element. However, those of ordinary skill in the art will recognize that other implementations are possible. The size of the horizontal expansion pattern is selected so that a sequence of all cell lines representing a scan line will optimally fill a display.

At reference numeral 64, the horizontal expansion pattern is appended to a sequence of horizontal expansion patterns representing a scan line. At reference numeral 66, a check is made to determine whether another data element should be read. If another data element is ready, execution continues at reference numeral 60. If there are no more data elements, the sequence of horizontal expansion patterns comprising an expanded scan line is complete.

Figure 6:
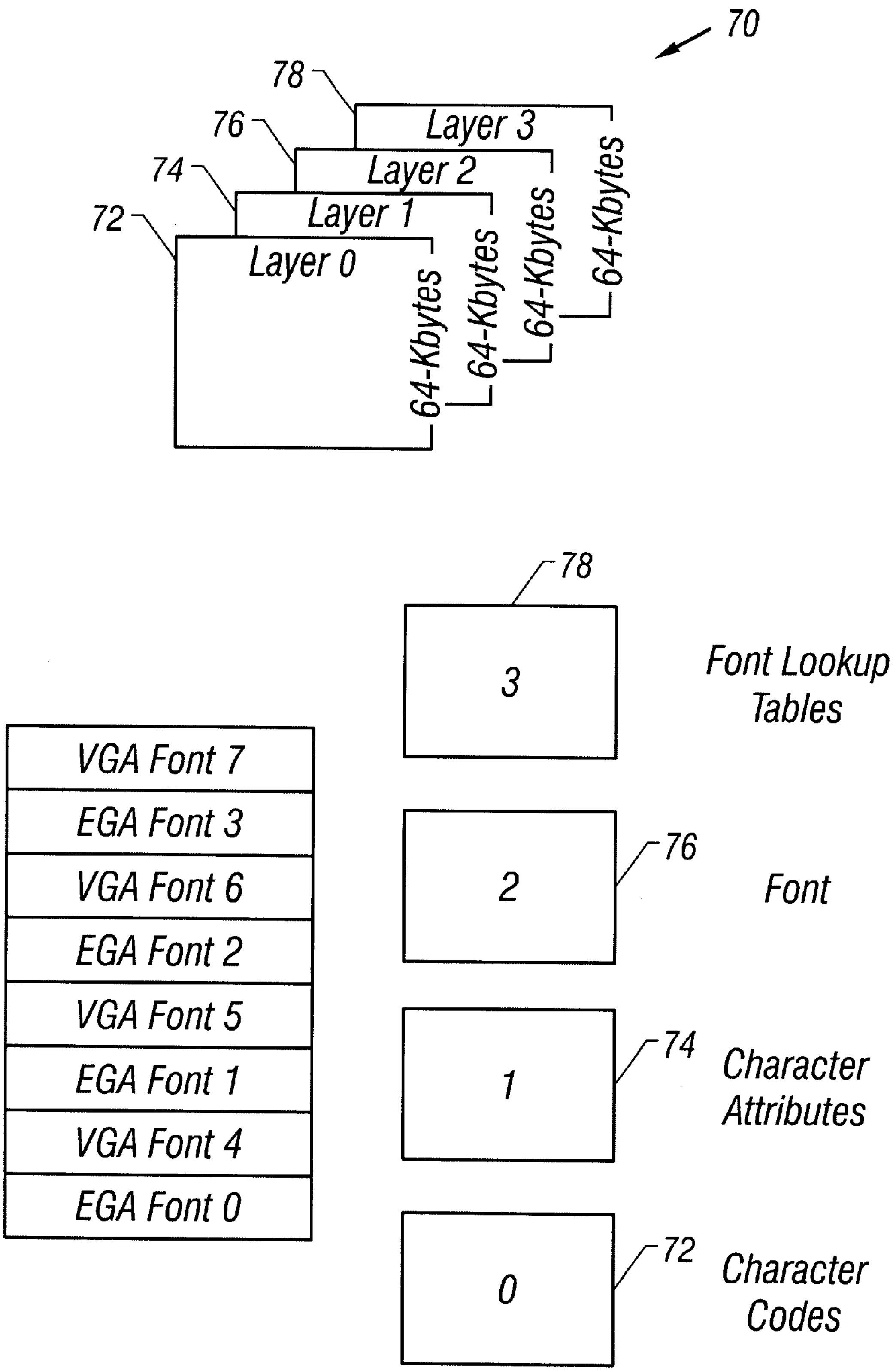
FIG. 6 is a block diagram illustrating the use of VGA memory in accordance with one embodiment of the present invention.

In accordance with another embodiment of the present invention, each lookup table used for generating expanded cell lines is located in VGA memory layer three. FIG. 6 illustrates a typical VGA Video RAM 40 organization. VGA Video RAM 40 is organized into four 64K parallel memory layers 70. The character code data for 256 characters resides in memory layer zero 72. The attribute data resides in memory layer one 74. The character generator stores the character definition table for converting the character code into pixel patterns in memory layer two 76. Those of ordinary skill in the art will recognize that memory layer three is normally unused 78. Therefore, the use of memory layer three for the lookup table will not conflict with other uses of the memory.

Figure 7:
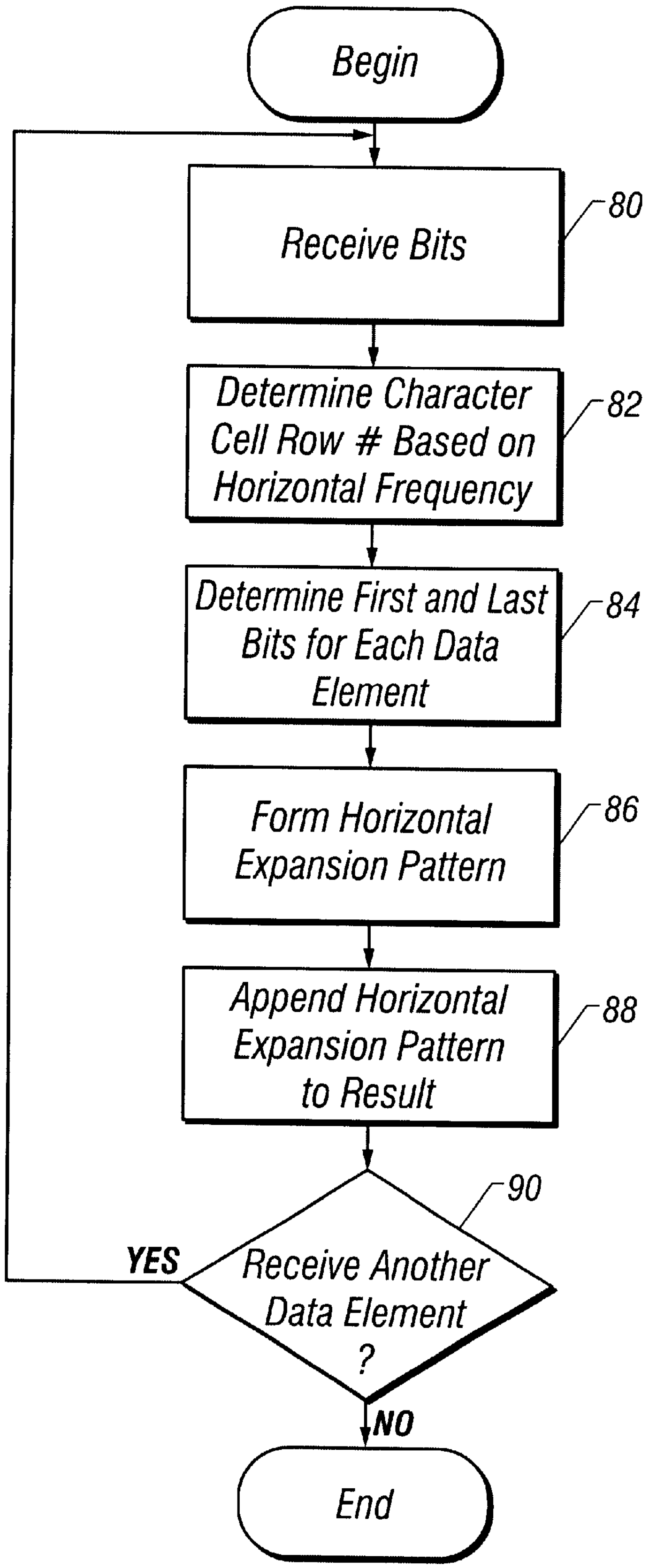
FIG. 7 is a flow diagram illustrating a method for stretching a text image in accordance with one embodiment of the present invention.

Referring now to FIG. 7, a method for the above embodiment is presented. At reference numeral 80, a sequence of bits comprising a series of cell lines is received from the character generator 32. At reference numeral 82, the cell line number is derived based upon the horizontal frequency.

At reference numeral 84, the first and last bits for each data element are determined. In a VGA system with 640×480 resolution, each data element comprises eight bits. In a VGA system with 720×480 resolution, each data element comprises nine bits. Typically, only the first seven pixels of each cell line contain character information. The remaining pixel(s) are set to the background color to maintain spacing between characters. The background color is typically represented by the value zero. According to this embodiment, a history buffer of the bits received at reference numeral 80 is maintained. This history buffer is scanned for repeating patterns of the bit representing the background color at multiples of eight or nine bits. When a repeating pattern is found, the first bit of a data sequence is set to the bit following the last bit of a repeating sequence. The last bit is determined based upon the first bit and the number of bits per data element.

At reference numeral 86, a horizontal expansion pattern is formed. The size of the horizontal expansion pattern is selected so that a sequence of all cell lines representing a scan line will optimally fill a display. At reference numeral 88, the horizontal expansion pattern is appended to a sequence of horizontal expansion patterns comprising a scan line. At reference numeral 90, a check is made to determine whether another data element should be read. If another data element is ready, execution continues at reference numeral 80. If there are no more data elements, the sequence of horizontal expansion patterns comprising an expanded scan line is complete.

According to another embodiment of the present invention, there are separate cell line expansion lookup tables for each cell line. The lookup table is loaded into VGA RAM during horizontal blanking. Keeping only one table in VGA RAM conserves VGA RAM and requires only one index into the table.

According to a presently preferred embodiment, the present invention may be implemented in software or firmware, as well as in programmable gate array devices, ASIC and other hardware.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A display control system for converting a VGA display signal to a flat panel display signal, comprising:

a video memory for storing character codes and associated attribute code data relating to a VGA display;

a character generator connected to said video memory and for generating a character font data based on the character code, row number and display resolution, said character font data based selected to fill a flat panel display;

a character generator memory connected to said character generator for storing character font data;

a shift register for receiving a data element from said character generator, said data element representing a row of a text character cell, forming a horizontal expansion pattern corresponding to said text character, and appending said horizontal expansion pattern to a sequence of horizontal expansion patterns representing a scan line; and a signal attribute controller for providing an output signal for a flat panel display from the output of the character generator under the control of said attribute code data.

2. A display control system according to claim 1 wherein said character generator memory resides in layer 3 of the VGA video RAM.

3. A display control system according to claim 1 wherein said attribute controller maps color attribute data to another color space.

4. A display control system for converting a VGA display signal to a flat panel display signal, comprising:

a video memory for storing character codes and associated attribute code data relating to a VGA display;

a character generator connected to said video memory and for generating a character font data based on the character code, row number and display resolution, said character font data based selected to fill a flat panel display;

a first character memory connected to said character generator for storing character font data;

a row number generator for deriving character row number based on horizontal frequency;

a second character memory for storing font data for a plurality of rows;

a shift register for receiving a data element from said character generator, said data element representing a row of a text character cell, forming a horizontal expansion pattern corresponding to said text character, and appending said horizontal expansion pattern to a sequence of horizontal expansion patterns representing a scan line; and an attribute controller for providing an output signal for a flat panel display from the output of said character generator under the control of said attribute code data, said attribute controller operatively coupled to said row number generator, said output signal comprising pixel data sufficient to fill the flat panel display.

5. A display control system according to claim 4 wherein said attribute controller maps color attribute data to another color space.

6. A display control system according to claim 3 wherein said attribute controller includes a lookup table for each row, each of said lookup tables containing expanded cell line information.

7. A display control system according to claim 6 wherein said row lookup tables reside in layer 3 of the VGA video RAM.

8. A display control system according to claim 7 wherein the row lookup table for the next row is loaded into VGA video RAM during horizontal blanking.

9. A computer system comprising:

a central processing unit;

a system memory;

a bus controller coupled to said central processing unit and said system memory;

a video controller coupled to said bus controller, said video controller comprising:

video memory for storing character codes and associated attribute code data relating to a VGA display;

a character generator connected to said video memory and for generating a character font data based on the character code, row number and display resolution, said character font data representing an expanded cell line;

a character generator memory connected to said character generator for storing character font data; and an attribute controller for providing an output signal for a flat panel display from the output of the character generator under the control of said attribute code data;

a shift register for receiving a data element from said character generator, said data element representing a row of a text character cell, forming a horizontal expansion pattern corresponding to said text character, and appending said horizontal expansion pattern to a sequence of horizontal expansion patterns representing a scan line; and a display panel coupled to said video controller for display of said output signal.

* * * * *

UNITED STATES PATENT AND TRADEMARK OFFICE

CERTIFICATE OF CORRECTION

PATENT NO. : 6,281,876 B1
DATED : August 28, 2001
INVENTOR(S) : Jones, Jr.

It is certified that error appears in the above-identified patent and that said Letters Patent is hereby corrected as shown below:

Column 2,
Line 38, remove “io”.

Column 3,
Line 4, replace “16” with -- 14 --.

Signed and Sealed this

Second Day of July, 2002

*Attest:*

JAMES E. ROGAN

*Attesting Officer*

*Director of the United States Patent and Trademark Office*